United States Patent
Blondel

(10) Patent No.: US 10,106,636 B2
(45) Date of Patent: Oct. 23, 2018

(54) CATIONIC POLYMER THICKENERS

(71) Applicant: S.P.C.M. SA, Andrezieux Boutheon (FR)

(72) Inventor: Frédéric Blondel, Lezigneux (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 29 days.

(21) Appl. No.: 15/531,503

(22) PCT Filed: Dec. 15, 2015

(86) PCT No.: PCT/EP2015/079884
§ 371 (c)(1),
(2) Date: May 30, 2017

(87) PCT Pub. No.: WO2016/096915
PCT Pub. Date: Jun. 23, 2016

(65) Prior Publication Data
US 2017/0260310 A1    Sep. 14, 2017

(30) Foreign Application Priority Data

Dec. 15, 2014   (EP) .................................... 14307032

(51) Int. Cl.
C08F 220/34    (2006.01)
C08F 2/10      (2006.01)
C11D 3/37      (2006.01)
D06M 15/267    (2006.01)
D06M 15/285    (2006.01)
D06M 15/356    (2006.01)

(52) U.S. Cl.
CPC .............. C08F 220/34 (2013.01); C08F 2/10 (2013.01); C11D 3/3769 (2013.01); D06M 15/267 (2013.01); D06M 15/285 (2013.01); *C11D 3/378* (2013.01); *D06M 15/3562* (2013.01); *D06M 2200/50* (2013.01)

(58) Field of Classification Search
CPC ........ C08F 220/34; C08F 2/10; C11D 3/3769; C11D 3/378; D06M 15/267; D06M 15/285; D06M 15/3562
USPC ....................................................... 428/402
See application file for complete search history.

(56) References Cited

U.S. PATENT DOCUMENTS

| | | | |
|---|---|---|---|
| 2002/0132749 A1 | 9/2002 | Smith et al. | |
| 2011/0271460 A1* | 11/2011 | Karagianni | C11D 3/0026 8/137 |
| 2011/0301312 A1* | 12/2011 | Blondel | C08F 220/34 526/220 |
| 2014/0213748 A1* | 7/2014 | Blondel | C08F 36/20 526/218.1 |

FOREIGN PATENT DOCUMENTS

| | | | |
|---|---|---|---|
| EP | 0261865 | * | 3/1988 |
| EP | 0261865 | A2 | 3/1988 |
| EP | 0343840 | A2 | 11/1989 |
| EP | 0884334 | * | 12/1998 |
| EP | 0884334 | A2 | 12/1998 |
| EP | 2373773 | * | 11/2012 |
| EP | 2373773 | B1 | 11/2012 |
| FR | 2937336 | * | 4/2010 |
| FR | 2937336 | A1 | 4/2010 |
| WO | 90/12862 | A1 | 11/1990 |

OTHER PUBLICATIONS

International Search Report and Written Opinion for PCT/EP2015/079884, dated Feb. 26, 2016.
International Preliminary Report on Patentability for PCT/EP2015/079884, dated Mar. 3, 2017.

* cited by examiner

*Primary Examiner* — Leszek B Kiliman
(74) *Attorney, Agent, or Firm* — Heslin Rothenberg Farley & Mesiti P.C.

(57) ABSTRACT

The invention relates to a process for preparing a cationic polymer thickener in particle form, said polymer consisting of a crosslinked water swellable cationic polymer comprising at least one cationic water soluble monomer and optionally at least one non-ionic water soluble monomer and/or at least one anionic water soluble monomer, wherein said polymer has a water extractable polymer content lower than 15 wt % as compared to the weight of the polymer, and wherein said polymer is obtained by gel polymerization of said monomers in the presence of from 500 ppm to 10.000 ppm of crosslinking agent relative to the weight of the monomers.

20 Claims, 1 Drawing Sheet

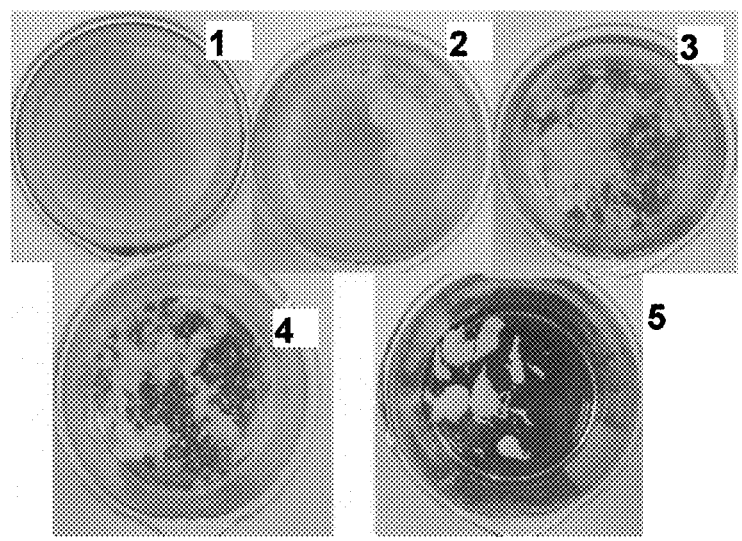

CATIONIC POLYMER THICKENERS

CROSS REFERENCE TO RELATED APPLICATIONS

This application is a national stage filing under section 371 of International Application No. PCT/EP2015/079884, filed on Dec. 15, 2015, and published on Jun. 23, 2016 as WO 2016/096915, which claims priority to European Application No. 14307032.4, filed on Dec. 15, 2014. The entire contents of each of said applications are hereby incorporated herein by reference.

FIELD OF THE INVENTION

This invention relates to the technical field of cationic crosslinked polymers in particles form, called "viscosity increasing particle", and their use as a thickening agent.

BACKGROUND OF THE INVENTION

Conventionally, most domestic fabric softener compositions contain thickening agents that improve their rheology profile.

Standard cationic polymeric thickeners are crosslinked water swellable polymers, such as those disclosed in WO 90/12862 (BP Chemicals), which relates to the use of lightly (5-45 ppm) crosslinked cationic thickeners, or US 2002/0132749 (Colgate-Palmolive Company) and Research Disclosure 429116, which relate to the use of heavily crosslinked cationic thickeners.

EP 2 373 773 (SNF) provides effective polymeric thickener having anti redeposition benefits. These polymers give to fabric softener composition a good rheology profile combined with a good anti redeposition profile. According to this document, it is essential that the polymer be prepared by means of a reverse phase oil-in-water emulsion polymerization.

One of the main drawbacks of fabric softener compositions is the difficulty to disperse easily and rapidly the composition in water, specifically when they are viscous. Generally the dispersion of such compositions takes time and involves mechanical stirring.

Despite great improvements in terms of rheology profile and anti-redeposition benefits, the polymeric thickeners described in EP 2 373 773 do not give full satisfaction in terms of dispersability properties in water. More specifically, the softening compositions comprising these polymers do not disperse readily and efficiently in water.

The prior art has failed to provide effective thickener having adequate satisfaction regarding the problem of dispersion in water, and having a satisfactory viscosifying capacity.

SUMMARY OF THE INVENTION

It is an object of the present invention to provide effective polymeric thickeners having good dispersability properties in water, in other terms easy to use.

The "good dispersability properties or easy to use" expression means that the fabric softener composition thickened with the polymeric thickener of the invention is able to be dispersed in water rapidly (in a few seconds), by simple hand mixing. The composition is homogeneously dispersed in water and therefore gives an "easy to use" benefit.

The Applicant has found that this goal is achieved by the use of a specific selection of polymeric thickeners obtained with a specific polymerization process.

The subject matter of the invention is a process for preparing a cationic polymer thickener in particle form. This polymer consists of a crosslinked water swellable cationic polymer comprising at least one cationic water soluble monomer and optionally at least one non-ionic water soluble monomer and/or at least one anionic water soluble monomer, wherein said polymer has an water extractable polymer content lower than 15 wt % as compared to the weight of the polymer. According to this process, said polymer is obtained by gel polymerization in the presence of a crosslinking agent concentration of from 500 ppm to 10.000 ppm relative to the weight of the monomer(s).

As discussed thereafter, the cationic polymer thickener resulting from this process has specific properties that are not obtainable when its monomers are polymerized in an inverse emulsion. The monomers are preferably monofunctional ethylenically unsaturated.

As mentioned in EP 0 343 840 A2 (page 3), a crosslinked water swellable polymer may comprise a mixture of different polymers consisting of linear polymers, branched polymers, lightly to fairly crosslinked polymer, and heavily crosslinked polymers. The linear and branched polymers are usually water soluble while the crosslinked polymers are water insoluble but water swellable.

As a result, a crosslinked water swellable polymer can comprise a fraction of water extractable polymers. The amount of water extractable depends on the amount of water soluble polymers i.e. the amount of linear and branched polymers within the structure of the crosslinked water swellable polymer. Accordingly, the skilled man in the art will be able to adjust the polymerization conditions so as to reach the desired amount of water extractable.

As already mentioned, the cationic polymers according to the present invention are in particle form and are also called "viscosity increasing particle".

The viscosity increasing particles of the present invention are swellable polymer particles.

Viscosity increasing particles are capable of swelling in water phase. That is to say that water phase associates with the particle (for example by hydration or penetration) thus creating an increase of the viscosity.

The viscosity of the composition increases with the stack of the swollen particles on each other.

The polymer according to the invention allows both the thickening of a softening composition and the dispersibility of said softening composition in water. The first technical effect (thickening) occurs upon preparation of the softening composition itself. On the other hand, the second technical effect (dispersibility in water) occurs when the softening composition is used in a softening/washing method, and therefore diluted in water.

The cationic polymers of the present invention show an unexpectedly dramatic improvement of the dispersability properties as compared to the polymers of the prior art, especially when compared with polymers being obtained by other polymerization methods such as inverse emulsion polymerization, same other parameters being identical.

The polymerization method (gel polymerization) associated with a high concentration of crosslinker and a low water extractable polymer content are essential in order to obtain a polymer having efficient dispersability properties in water.

The invention is therefore based on the selections of 1/polymerization conditions (gel+500-5000 ppm of crosslinking agent) and 2/polymer (cationic, water swellable, less than 15 wt % of water extractable polymer content).

The cationic polymers of the present invention are in particle form. They are crosslinked and have a three dimensional network in which water phase can be trapped. As the water phase penetrates in the network, the volume of particle can increase from 10 to 1000 times the initial volume of the particle. The resulting particle corresponds to a swollen particle.

Proximity of the particles filled with the aqueous phase of the composition and particles packing leads to an improvement of the viscosity of the composition. In other terms, the viscosity increases with the stack of the swollen particles on each other which leads to the filling of the container containing the composition with the swollen particles. Such filling is comparable to a container charging and filling with balls or beads.

In fact, when swollen, the particle consists of a swollen crosslinked cationic polymer, has a particle size of at least 25 micrometers. According to another embodiment, it has a particle size ranging from 25 to 5000 micrometers, preferably from 25 to 1000 micrometers, and most preferably from 50 to 500 micrometers.

All particles sizes have been calculated as volume averages.

The particle size refers to the average size of the longest dimension of the particle i.e. its diameter when the particle is spherical, or its length when the particle has a cylindrical or parallelepipedic shape for instance. It preferably refers to the diameter of the spherical swollen particle.

The swollen particle relates to the crosslinked cationic polymer being saturated with water. As it is well known in the art, an aqueous solution can be thickened by addition of a polymeric thickener. As the polymeric thickener swells in the presence of water, it gets bigger and the molecules of polymeric thickener get closer and interact with each other. This phenomenon leads to the thickening of the aqueous solution.

The particle size of the swollen crosslinked cationic polymer can be measured with conventional apparatus, such as a laser particle sizer according conventional technics known by the skill man of the art. An example of device for measuring the particle size is the Mastersizer Scirocco 2000 from Malvern Instruments.

Good dispersion is characterized by good, uniform separation of the particles in the liquid, and by the speed of the separation of the particles.

A suitable method for dispersion assessment is described below. This gives a Dispersion Index (DI) on a scale of 1 to 5.

17 ml of a composition to be tested is poured from a container into 1000 ml of cold tap water in a 2000 ml beaker. After 30 seconds the resultant mix is visually assessed and ranked on a scale of 1-5, using half scores where appropriate. The scale is defined as follows:

Rating 1: Spontaneous dispersion; the solution is uniformly dispersed with no lumps or bits. See FIG. 1

Rating 2: The product disperses spontaneously giving an even dispersion with only a few small lumps or bits. See FIG. 2.

Rating 3: The product disperses to give mainly small lumps or bits, but the dispersion is fine and gives lightly cloudy/coloured solution. See FIG. 3.

Rating 4: The product breaks up into a few medium and/or large sized lumps with no fine dispersion; the water remains substantially clear and colourless. See FIG. 4.

Rating 5: The product does not break up at all on entering the water. It typically forms one or two large lumps in clear water. See FIG. 5.

In a preferred embodiment, the water extractable polymer content is preferably below 10 percent, and most preferably below 7.5 percent as compared to the weight of the polymer.

It is essential according to the invention that the polymer be prepared by gel polymerization to obtain polymeric thickeners particles having good dispersability properties. Polymeric thickeners obtained by reverse phase oil-in-water emulsion polymerization do not exhibit such good properties.

Furthermore, advantages are obtained in the overall performances in a fabric softening composition comprising the cationic polymer of the present invention versus a similar composition including standard cationic polymeric thickeners and more particularly, a higher stability upon aging and very good viscosifying properties.

Typically, the viscosity of a fabric softening composition is comprised between 10 and 10.000 cps, preferably between 50 and 5.000 cps. The viscosity is measured with a Brookfield viscometer with a RVT modulus at 10 rpm, 25° C.

The amount of cationic polymer according to the invention in a fabric softening composition is typically comprised between 0.1% and 10% by weight, preferably between 0.2 and 7% by weight. This amount corresponds to the polymer in dry form which has not yet absorbed water.

The cationic polymeric thickener of the invention is prepared by means of a gel polymerization, by polymerizing:
  at least one cationic water soluble monomer,
  and optionally other non-ionic and/or anionic water soluble monomers,
  in the presence of at least one crosslinking agent and optionally of at least one chain transfer agent.

As already mentioned, the overall charge of the polymer is cationic, it necessarily contains at least one cationic monomer. In other words, when the polymer contain anionic and/or non-ionic monomers, the amount of cationic charges is greater than the amount of anionic charges.

As already mentioned, it is essential according to the invention that the polymer is prepared by means of a gel polymerization.

Gel polymerization is a well-known polymerization technique consisting of polymerizing water soluble monomers in an aqueous media in order to obtain a gel which is then generally cut or sliced, and dried so as to obtain a polymer in powder form. The resulting polymer may be pre-added in water or in another solvent before use. It may also be used as a powder.

The water solubility of a monomer refers to its ability to be soluble in water, in conventional gel polymerization conditions.

The gel, resulting from the polymerization, has generally a viscosity of at least 100.000 cps at 25° C. (Broofield Viscosity), and preferably around 200.000 cps. The gel consists essentially of polymer and water. The polymer content generally being at least 10% and preferably 25% by weight, and being below 60%, and preferably below 50% by weight, these percentages being based on the weight of polymer and water. The gel may include other components, for instance inorganic salts.

According to the invention, the polymeric thickeners being prepared by gel polymerization are prepared by:
  adding in an aqueous media, generally water, at least one cationic monomer, and optionally other non-ionic and/ or anionic monomers, in the presence of a crosslinking agent and optionally of a chain transfer agent;

starting the polymerization;

obtaining a gel;

transforming the gel in solid particles, generally a powder.

As already mentioned, the invention involves the gel polymerization of water soluble monomers.

The resulting gel is converted to powder by conventional manner, for instance by cutting the mass of gel into pieces and/or by extruding a mass of gel through coarse orifices, optionally cutting the gel before or after the extrusion, and by drying the pieces of gel by conventional manner, for instance by heating.

The particle according to the invention can be added to the softening composition to be thickened, as a powder or as a liquid dispersion. The added amount is preferably comprised between 0.1% and 10% in weight, more preferably between 0.5 and 7%. This amount corresponds to the polymer in dry powder form which has not yet trapped any water.

The polymerization is generally a radical polymerization generally induced thanks to a redox couple, for instance sodium persulfate and sodium metabisulfite.

The expert will know, on the basis of his own knowledge, how to adjust parameters of the gel polymerization.

According to the invention, the crosslinking agent concentration is comprised in the range of 500 ppm to 10.000 ppm in weight relative to the total amount of monomers, preferably greater than 700 ppm.

Following is a non-restrictive list of crosslinking agents: methylene bisacrylamide (MBA), ethylene glycol diacrylate, polyethylene glycol dimethacrylate, diacrylamide, triallylamine, glyoxal, compounds of the glycidyl ether type such as ethyleneglycol diglycidyl ether, allylpentaerythritol, trimethylolpropane diallylether, or any other means familiar to the expert permitting crosslinking.

Preferred crosslinking agents are methylene bisacrylamide (MBA), triallylamine and allylpentaerythritol.

When the crosslinking agent used is the methylene bisacrylamide, its concentration is preferably comprised between of 500 ppm and 5000 ppm in weight relative to the monomers.

When the crosslinking agent used is the triallylamine, its concentration is preferably comprised between of 1000 and 10000 ppm in weight relative to the monomers.

Cationic monomers used for the invention are selected from the group consisting of the following monomers and quaternized or salified derivatives: dimethylaminopropyl-methacrylamide, dimethylaminopropylacrylamide, diallylamine, methyldiallylamine, dialkylaminoalkyl-acrylates, dialkylaminoalkyl-methacrylates, dialkylaminoalkyl-acrylamides, and dialkylaminoalkyl-methacrylamides.

It has been found that specific cationic monomers have an optimum performance in terms of dispersability properties. In a preferred embodiment, cationic monomer is dimethyl-aminoethyl-methacrylate and their quaternized or salified derivatives and/or dimethylaminopropylmethacrylamide and their quaternized or salified derivatives.

In a most preferred embodiment, the cationic monomer is dimethylaminoethyl methacrylate methyl chloride salt or dimethylaminoethyl methacrylate quaternary ammonium salt.

In a preferred embodiment, the polymeric thickener of the invention is prepared by polymerizing:

more than 50 mol % of at least one cationic monomer, preferably more than 70 mol %, most preferably more than 80 mol %;

optionally less than 50 mol % of at least one non-ionic and/or anionic monomer;

in the presence of crosslinking agent in an amount comprising between 500 ppm to 10.000 ppm relative to the total weight of monomers, the total amount of monomers being 100%.

These percentages are based on the total amount of monomers. However, the amount of a crosslinking agent and the amount of chain transfer agent are in ppm in weight relative to the weight of total monomers i.e. relative to the above mentioned 100 mol % of monomers.

Chain transfer agents, such as isopropyl alcohol, sodium hypophosphite, mercaptoethanol, may be used in the polymerization mixture in order to control the polymeric chain's length and the crosslinking density.

According to the invention, when a chain transfer agent is used, its concentration is comprised in the range of 10 ppm to 1000 ppm in weight relative to the total amount of monomers.

Non-ionic monomers used for the invention are selected from the group consisting of acrylamide, methacrylamide, N-Alkyl acrylamide, N-vinyl pyrrolidone, N-vinyl formamide, N-vinyl acetamide, vinylacetate, vinyl alcohol, acrylate esters, allyl alcohol.

Preferred non-ionic monomer is acrylamide.

Anionic monomers used for the invention are selected from the group consisting of acrylic acid, methacrylic acid, itaconic acid, crotonic acid, maleic acid, fumaric acid, as well as monomers performing a sulfonic acid or phosphonic acid functions, such as 2-acrylamido-2-methyl propane sulfonic acid (ATBS) said anionic monomers being in any of its acid, or partially or totally salified form.

Preferred anionic monomers are acrylic acid and 2-acrylamido-2-methyl propane sulfonic acid (ATBS) said anionic monomers being in any of its acid, or partially or totally salified form.

Optionally, the polymeric thickener of the invention may also contain monomers having hydrophobic character.

According to an embodiment of the invention, the crosslinked water swellable cationic polymer is obtained by gel polymerization of dimethyl aminoethyl methacrylate quaternised with methyl chloride (cationic monomer), acrylamide (non-ionic monomer), and methylene bisacrylamide (crosslinking agent).

The water extractable polymer content is the ratio between the mass of the polymer which can be extracted when the polymer is submitted to dispersion in water and the total mass of the polymer.

The method for determining water extractable polymer content of the cationic polymer is based on the basic principle of colloidal titration which is well-known by the chemists and the skilled man of the art.

The method consists to separate the water-soluble part ("extractable" polymer) from the water-insoluble part of the cationic polymer particles of the invention to obtain a filtrate containing only the water-soluble part, and then to measure by colloidal titration the water-soluble polymer content in the filtrate. The water extractable polymer content is the ratio between the mass of the polymer in the filtrate and the total mass of the polymer.

Step 1: Polymer Extraction

This step consists in separating insoluble polymer (swollen particles) from water soluble polymer: 0.5 g (m0 in g) of polymer is added to a beaker containing 800 ml of deionized water. The mixture is slightly stirred with a magnetic stirrer for 6 hours. Then, 8 g of NaCl are added to complete the extraction. The salt solution is still stirred for 1 hour. The polymer mixture is then filtered over a 100 μm screen, and 15 minutes later the filtrate is then recovered in order to measure its weight (M0 in g). The polymer content "water extractables" in the filtrate is then titrated.

Step 2: Polymer Titration

The titration principle is a well-known colloidal titration used to determine charge density of cationic polymers. The colloidal titration is performed as follows.

A potassium polyvinyl sulphate (PVSK) solution is prepared by dissolving in desionized water a PVSK polymer having a molecular weight of 243.300 g/mol, so as to obtain a solution having a concentration of 0.0025 N (N/400).

A 0.1 N solution of chlorhydric acid is prepared in deionized water.

Titration is carried out on 30 g of polymer solution (filtrate) acidified with chlorhydric acid (pH=4) and coloured with 2-3 droplets of blue indicator. The PVSK solution is slowly added until the color turns from blue to violet (equilibrium).

The water extractable polymer content (percentage of "extractables") is then determined according to (i) the volume of PVSK measured at equilibrium, (ii) the polymer composition, (iii) the polymer weight and (iv) the reagents molarity thanks to the following equation:

$$\% \text{ "Extractables"} = \left[ Veq \times \frac{N}{400} \times \frac{M0}{30} \right] / \left[ \frac{m0 \times x}{y} \right] \times 100$$

Veq: volume in ml of PVSK solution added at the equilibrium.

N/400: concentration of PVSK in the PVSK solution (N=1).

M0: mass in grams of the total filtrate recovered in step 1.

"m0": mass in grams of polymer added in water in step 1.

x correspond to the percentage in weight of cationic monomers based on total amount of monomers.

y corresponds to the molecular weight of the cationic monomer.

The expert will understand optimization of the polymerization conditions by reading this description and because of his individual knowledge, or as a result of simple routine tests, such that the final polymer has a water extractable polymer content below 15% by weight of the total polymer.

The expert will know in particular how to estimate, on the basis of his own knowledge, the amount of crosslinking to be used in order to obtain a final polymer having an adequate fraction of water-soluble polymer and the desired rheology.

It is known for example that an increase of the concentration of crosslinking agent, other parameters being identical, leads to a decrease the extractable polymer content. The reverse is true.

The main parameter, which allows the skilled man of the art to adjust the water extractable polymer content, is the concentration of crosslinking agent.

The invention and its advantages will become more apparent to one skilled in the art from the following figures and examples.

BRIEF DESCRIPTION OF THE DRAWINGS

FIG. 1 shows a photo of the top view of a container comprising 1 liter of water and 17 mL of a thickened softening composition with an excellent dispersability corresponding to rate 1.

FIG. 2 shows a photo of the top view of a container comprising 1 liter of water and 17 mL of a thickened softening composition with a good dispersability corresponding to rate 2.

FIG. 3 shows a photo of the top view of a container comprising 1 liter of water and 17 mL of a thickened softening composition with a medium dispersability corresponding to rate 3.

FIG. 4 shows a photo of the top view of a container comprising 1 liter of water and 17 mL of a thickened softening composition with a bad dispersability corresponding to rate 4.

FIG. 5 shows a photo of the top view of a container comprising 1 liter of water and 17 mL of a thickened softening composition with a very bad dispersability corresponding to rate 5.

EXAMPLES

Examples demonstrate the good performances of new polymers in terms of dispersability in water of a softener composition compare to the bad performances when polymers are made by inverse emulsion polymerization.

New polymers are also able to give satisfactory viscosifying properties.

A) Synthesis of Cationic Polymer by Gel Polymerization

Polymer 1

A monomer solution is prepared by adding and stirring the following ingredients in a glass beaker:
- 9.0 parts of acrylamide solution (concentration in weight 50%, said monomer has a molecular weight of 71 g/mol) i.e. 4.5 parts of acrylamide
- 71.0 parts of dimethyl aminoethyl methacrylate quaternised with methyl chloride (concentration in weight 75%, said monomer has a molecular weight of 207.7 g/mol), i.e. 53.25 parts of said monomer
- 20.0 parts of deionized water
- 800 ppm of methylene bis acrylamide (ppm relative to the weight of the monomers)
- 7550 ppm of sodium formate (ppm relative to the weight of the monomers)
- pH is adjusted with phosphoric acid at a pH comprised between 3.4 and 3.8

The polymer composition (monomer ratio) in weight is 92.0% of dimethyl aminoethyl methacrylate quaternised and 8.0% acrylamide.

After 30 minutes of stirring, the monomer solution is cooled down to 10° C., transferred in a Dewar flask, and then sparged with nitrogen for 15 minutes to remove oxygen.

The polymerization is run in an adiabatic manner by addition of:
- a redox couple of sodium persulfate (20 ppm/Total weight of monomers) and Mohr salt (10 ppm/Total weight of monomers). Salt quantity is pre-diluted in water à 25 g/L
- an azo-compound, azobisisobutironitrile, dispersed at 500 ppm/Total weight of monomers The temperature of the solution rises spontaneously to 75° C. in 2 hours, and then held for 2 additional hours at 75° C. The resulting mixture turns into a sticky gel. This gel is then sliced into small pieces of 2-5 mm and then dried in an oven for 24 hours at 80° C. Dried particles are then grinded and sieved in order to get a fine and free flowing powder with an average particle size of less than 250 μm.

Residual moisture of this power is <10.0%, as determined by weight loss after 2 hours in a drying oven at 105° C.

Polymer 2: The procedure and formulation of polymer 1 are repeated with only 350 ppm in weight of methylene bis acrylamide. A powder is obtained having a particle size of less than 250 µm.

Polymer 3: The procedure and formulation of polymer 1 are repeated in replacing methylene bis acrylamide with 8.000 ppm in weight of PEG 8000 dimethacrylate. A powder is obtained having a particle size of less than 250 µm.

Polymer 4: Polymer 4 corresponds to polymer 1 in terms of monomer composition, monomer ratio, crosslinking agent concentration and transfer agent concentration. However, it has been prepared by inverse emulsion polymerization as described in EP 2 373 773, and the obtained inverse emulsion is precipitated in acetone, filtered and then dried to a powder form.

B) Polymer Characteristics

The absorption capacity is determined as follows:
- 800 g of deionized water is loaded in a 1 L beaker
- 1.0 g (M1) of the cationic polymer in powder form is poured in the beaker
- The mixture is let at rest for 3 hours
- This mixture is then poured in a filter bag with 100 µm opening
- The remaining swollen and fully hydrated gel is then weighed (M2)
- Absorption capacity (in g/g) is M2/M1

Two tests are done. A first one is done in desionized water alone. A second test is done in deionized water containing 1% in weight of calcium formate salt.

TABLE 1

Properties of polymers 1, 2 and 3

| Polymer | Residual moisture (%) | Dezionized water (g/g) | Dezionized water + salt (g/g) |
|---|---|---|---|
| Polymer 1 (invention) | 9.8 | 450 | 50 |
| Polymer 2 | 8.4 | 1300 | 135 |
| Polymer 3 | 9.8 | 900 | 80 |
| Polymer 4 | 5.4 | 5 | 2 |

The water extractable polymer content, i.e. the "extractables" is determined at 25° C. as follows:

Step 1: Polymer Extraction

This step consists in separating the insoluble polymeric part (swollen particles) from the water soluble polymeric part of a polymer:

0.5 g (m0 in g) of polymer is added in a beaker containing 800 ml of deionized water.

The mixture is slightly stirred with a magnetic stirrer for 6 hours. Then, 8 g of NaCl are added to complete the extraction.

The salt solution is still stirred for 1 hour.

The polymer mixture is then filtered over a 100 µm screen, and 15 minutes later the filtrate is recovered and weighed (M0 in g).

The polymer content "extractables" in the filtrate is then titrated.

Step 2: Polymer Titration

The titration principle is a well-known colloidal titration used to determine the charge density of a polymer, preferably a cationic polymer.

The colloidal titration of a cationic polymer is performed as follows:

A potassium polyvinyl sulphate (PVSK) solution is prepared by dissolving in desionized water a PVSK having a molecular weight of 243.300 g/mol, to obtain a solution having a concentration of 0.0025 N (N/400).

A solution of chlorhydric acid is prepared by dissolving in desionized water chlorhydric acid to obtain a solution having a concentration of 0.1 N.

Titration is run on 30 g of polymer solution (filtrate) acidified with chlorhydric acid (pH=4) and coloured with 2-3 droplets of blue indicator. PVSK solution is added slowly until the color turns from blue to violet (equilibrium).

The water extractable polymer content (percentage of "extractables") is then determined according to volume of PVSK measured at equilibrium, polymer composition, polymer weight and reagents molarity.

$$\% \text{ "Extractables"} = \left[ Veq \times \frac{N}{400} \times \frac{M0}{30} \right] / \left[ \frac{m0 \times 0.92}{207.7} \right] \times 100$$

Veq: volume in ml of PVSK solution added at the equilibrium.

N/400: concentration of PVSK in the PVSK solution (N=1).

M0: mass in grams of the total filtrate recovered in step 1.

"m0": mass in grams of polymer added in water in step 1.

TABLE 2

Water extractable polymer content of polymer 1, 2 and 3

| Polymer | "extractables" |
|---|---|
| Polymer 1 (invention) | 6.1% |
| Polymer 2 | 25.2% |
| Polymer 3 | 35.0% |
| Polymer 4 | 12.8% |

C) Dispersion Test

This test consists in structuring—viscosifying a commercial fabric conditioner (Low viscous formulation with the following reference—Cajoline Tentation Jasmin with a Brookfield viscosity of 100 cps.

a—Samples Preparation—Softening Composition

Under mechanical stirring (3 blades impeller—500 rpm), add the active polymer into the commercial fabric conditioner. Then the mixture is submitted to 30 seconds of intensive shear (Ultrathurrax—6000 rpm). Viscosity is then controlled with Brookfield RVT, 10 rpm at 25° C.

TABLE 3

Viscosity of softening compositions

| Polymer (wt %) | Viscosity (cps) |
|---|---|
| Control (fabric conditioner w/o polymer) | 100 |
| +0.25% Polymer 1 | 960 |
| +0.25% Polymer 2 | 500 |
| +0.25% Polymer 3 | 350 |
| +0.25% Polymer 4 | 700 | b—Dispersability Evaluation in Water

A suitable method for dispersion assessment is described below. This gives a Dispersion Index (DI) on a scale of 1 to 5.

17 ml of a composition to be tested is poured from a container into 1000 ml of cold tap water in a 2000 ml beaker. After 30 seconds the resultant mix is visually assessed and ranked on a scale of 1-5, using half scores where appropriate.

Rating 1: Spontaneous dispersion; the solution is uniformly dispersed with no lumps or bits.

Rating 2: The product disperses spontaneously giving an even dispersion with only a few small lumps or bits.

Rating 3: The product disperses to give mainly small lumps or bits, but the dispersion is fine and gives lightly cloudy/coloured solution.

Rating 4: The product breaks up into a few medium and/or large sized lumps with no fine dispersion; the water remains substantially clear and colourless.

Rating 5: The product does not break up at all on entering the water. It typically forms one or two large lumps in clear water.

Polymers 1, 2 and 3 have been prepared by gel polymerization. However, polymer 4 has been prepared by inverse emulsion polymerization.

TABLE 4

Dispersability evaluation of softening composition thickened with the polymer according to the invention (polymer 1) as compared to polymers having a greater water extractable content (polymers 2 and 3) and a polymer prepared by inverse emulsion polymerization (polymer 4).

| Polymer (wt %) | Dispersability score |
| --- | --- |
| Control (fabric conditioner w/o polymer) (FIG. 1) | 1 |
| +0.25% Polymer 1 | 1-2 |
| +0.25% Polymer 2 | 3-4 But stringy solution - Not acceptable |
| +0.25% Polymer 3 | 5 stringy solution - Not acceptable |
| +0.25% Polymer 4 | 5 - Not acceptable |

The polymer of the invention demonstrates superior dispersability properties of softening composition in water, in addition to good thickening properties.

Although polymers 1 (invention) and 4 (EP 2 373 773) have the same composition, and a percentage of extractable below 15%, they do not have the same dispersability properties.

This surprising difference results from the polymerization technique. Polymer 1 has been prepared by gel polymerization while polymer 4 has been prepared by inverse emulsion polymerization.

These results clearly show that, in this case, the polymerization technique is essential so as to improve the dispersability properties. The gel polymerization technique does not afford the same polymer as the inverse emulsion polymerization.

The invention claimed is:

1. A cationic polymer thickener in particle form, said polymer consisting of a crosslinked water swellable cationic polymer comprising at least one cationic water soluble monomer and optionally at least one non-ionic water soluble monomer and/or at least one anionic water soluble monomer, wherein said polymer has a water extractable polymer content lower than 15 wt % as compared to the weight of the polymer, and wherein said polymer is obtained by gel polymerization of said monomers in the presence of from 500 ppm to 10.000 ppm of crosslinking agent relative to the weight of the monomers wherein the water extractable polymer content is measured according to the following method:

step 1: polymer extraction—this step consists in separating insoluble polymer from water soluble polymer: 0.5 g (m0 in g) of polymer is added to a beaker containing 800 ml of deionized water, the resulting mixture is slightly stirred with a magnetic stirrer for 6 hours, then, 8 g of NaCl are added to complete the extraction, the resulting salt solution is still stirred for 1 hour, the polymer mixture is then filtered over a 100 μm screen, and 15 minutes later, the filtrate is then recovered in order to measure its weight (M0 in g), the polymer content water extractables in the filtrate is then titrated, step 2: polymer titration by colloidal titration to determine charge density of cationic polymers as follows a potassium polyvinyl sulphate (PVSK) solution is prepared by dissolving in desionized water a PVSK polymer having a molecular weight of 243,300 g/mol, so as to obtain a solution having a concentration of 0.0025 N (N/400), a 0.1 N solution of chlorhydric acid is prepared in deionized water, titration is carried out on 30 g of polymer solution (filtrate) acidified with chlohydric acid (pH=4) and coloured with 2-3 droplets of blue indicator, the resulting PVSK solution is slowly added until the color turns from blue to violet, the water extractable polymer content is then determined according to (i) the volume of PVSK measured at equilibrium, (ii) the polymer composition, (iii) the polymer weight and (iv) the reagents molarity thanks to the following equation:

$$\% \text{ "Extractables"} = \left[Veq \times \frac{N}{400} \times \frac{M0}{30}\right] / \left[\frac{m0 \times x}{y}\right] \times 100$$

wherein:

Veq: volume in ml of PVSK solution added at the equilibrium,

N/400: concentration of PVSK in the PVSK solution (N=1),

M0: mass in grams of the total filtrate recovered in step 1, m0: mass in grams of polymer added in water in step 1, x corresponds to the percentage in weight of cationic monomers based on total amount of monomers, y corresponds to the molecular weight of the cationic monomer.

2. The cationic polymer according to claim 1, wherein, when swollen, the particle consists of a swollen crosslinked cationic polymer, having a volume average particle size ranging from 25 to 5000 micrometers, a swollen particle relating to the crosslinked cationic polymer being saturated with water.

3. The cationic polymer according to claim 1, wherein, when swollen, the particle consists of a swollen crosslinked cationic polymer, having a volume average particle size ranging from 50 to 500 micrometers, a swollen particle relating to the crosslinked cationic polymer being saturated with water.

4. The cationic polymer according to claim 1, comprising more than 50 mol % of at least one cationic monomer;

the total amount of monomers being 100 mol %.

5. The cationic polymer according to claim 1, wherein the cationic monomer is selected from the group consisting of the following monomers and their quaternized or salified derivates: dimethyl aminopropylmethacrylamide; dimethylaminopropylacrylamide; diallylamine; methyldiallylamine;

dialkylaminoalkyl-acrylate; dialkylaminoalkyl methacrylate; dialkylaminoalkyl-acrylamide; and dialkylaminoalkyl-methacrylamide.

6. The cationic polymer according to claim 1, wherein the crosslinking agent is selected from the group consisting of methylene bisacrylamide, ethylene glycol diacrylate, polyethylene glycol dimethacrylate, diacrylamide, triallylamine, glyoxal, ethyleneglycol diglycidyl ether, allylpentaerythritol, and trimethylolpropane diallylether.

7. The cationic polymer according to claim 1, wherein the non-ionic monomer is selected from the group consisting of acrylamide; méthacrylamide; N-alkyl acrylamide; N-vinyl pyrrolidone; N-vinyl formamide; N-vinyl acetamide; vinylacetate; vinyl alcohol; acrylate esters; and allyl alcohol.

8. The cationic polymer according to claim 1, wherein the anionic monomer is selected from the group consisting of: acrylic acid; methacrylic acid; itaconic acid; crotonic acid; maleic acid; fumaric acid; and monomers performing a sulfonic acid or phosphonic acid function; said anionic monomers being in any of its acid, or partially or totally salified form.

9. The cationic polymer according to claim 2, comprising more than 50 mol % of at least one cationic monomer;
the total amount of monomers being 100 mol %.

10. The cationic polymer according to claim 3, comprising more than 50 mol % of at least one cationic monomer;
the total amount of monomers being 100 mol %.

11. The cationic polymer according to claim 2, wherein the cationic monomer is selected from the group consisting of the following monomers and their quaternized or salified derivates: dimethylaminopropylmethacrylamide; dimethylaminopropylacrylamide; diallylamine; methyldiallylamine; dialkylaminoalkyl-acrylate; dialkylaminoalkyl methacrylate; dialkylaminoalkyl-acrylamide; and dialkylaminoalkyl-methacrylamide.

12. The cationic polymer according to claim 9, wherein the cationic monomer is selected from the group consisting of the following monomers and their quaternized or salified derivates: dimethylaminopropylmethacrylamide; dimethylaminopropylacrylamide; diallylamine; methyldiallylamine; dialkylaminoalkyl-acrylate; dialkylaminoalkyl methacrylate; dialkylaminoalkyl-acrylamide; and dialkylaminoalkyl-methacrylamide.

13. The cationic polymer according to claim 2, wherein the crosslinking agent is selected from the group consisting of methylene bisacrylamide, ethylene glycol diacrylate, polyethylene glycol dimethacrylate, diacrylamide, triallylamine, glyoxal, ethyleneglycol diglycidyl ether, allylpentaerythritol, and trimethylolpropane diallylether.

14. The cationic polymer according to claim 9, wherein the crosslinking agent is selected from the group consisting of methylene bisacrylamide, ethylene glycol diacrylate, polyethylene glycol dimethacrylate, diacrylamide, triallylamine, glyoxal, ethyleneglycol diglycidyl ether, allylpentaerythritol, and trimethylolpropane diallylether.

15. The cationic polymer according to claim 2, wherein the non-ionic monomer is selected from the group consisting of acrylamide; méthacrylamide; N-alkyl acrylamide; N-vinyl pyrrolidone; N-vinyl formamide; N-vinyl acetamide; vinylacetate; vinyl alcohol; acrylate esters; and allyl alcohol.

16. The cationic polymer according to claim 9, wherein the non-ionic monomer is selected from the group consisting of acrylamide; méthacrylamide; N-alkyl acrylamide; N-vinyl pyrrolidone; N-vinyl formamide; N-vinyl acetamide; vinylacetate; vinyl alcohol; acrylate esters; and allyl alcohol.

17. The cationic polymer according to claim 2, wherein the anionic monomer is selected from the group consisting of: acrylic acid; methacrylic acid; itaconic acid; crotonic acid; maleic acid; fumaric acid; and monomers performing a sulfonic acid or phosphonic acid function; said anionic monomer being in any of its acid, or partially or totally salified form.

18. The cationic polymer according to claim 9, wherein the anionic monomer is selected from the group consisting of: acrylic acid; methacrylic acid; itaconic acid; crotonic acid; maleic acid; fumaric acid; and monomers performing a sulfonic acid or phosphonic acid function; said anionic monomer being in any of its acid, or partially or totally salified form.

19. The cationic polymer according to claim 1, wherein, when swollen, the particle consists of a swollen crosslinked cationic polymer, having a volume average particle size ranging from 25 to 5000 micrometers,
a swollen particle relating to the crosslinked cationic polymer being saturated with water, and wherein:
the cationic polymer according comprises more than 50 mol % of at least one cationic monomer, the total amount of monomers being 100 mol %;
the cationic monomer is selected from the group consisting of the following monomers and their quaternized or salified derivates: dimethylaminopropylmethacrylamide; dimethylaminopropylacrylamide; diallylamine; methyldiallylamine; dialkylaminoalkyl-acrylate; dialkylaminoalkyl methacrylate; dialkylaminoalkyl-acrylamide; and dialkylaminoalkyl-methacrylamide;
the crosslinking agent is selected from the group consisting of methylene bisacrylamide, ethylene glycol diacrylate, polyethylene glycol dimethacrylate, diacrylamide, triallylamine, glyoxal, ethyleneglycol diglycidyl ether, allylpentaerythritol, and trimethylolpropane diallylether;
the non-ionic monomer is selected from the group consisting of acrylamide; méthacrylamide; N-alkyl acrylamide; N-vinyl pyrrolidone; N-vinyl formamide; N-vinyl acetamide; vinylacetate; vinyl alcohol; acrylate esters; and allyl alcohol; and
the anionic monomer is selected from the group consisting of: acrylic acid; methacrylic acid; itaconic acid; crotonic acid; maleic acid; fumaric acid; and monomers performing a sulfonic acid or phosphonic acid function; said anionic monomer being in any of its acid, or partially or totally salified form.

20. The cationic polymer according to claim 10, wherein:
the cationic polymer according comprises more than 50 mol % of at least one cationic monomer, the total amount of monomers being 100 mol %;
the cationic monomer is selected from the group consisting of the following monomers and their quaternized or salified derivates: dimethylaminopropylmethacrylamide; dimethylaminopropylacrylamide; diallylamine; methyldiallylamine; dialkylaminoalkyl-acrylate; dialkylaminoalkyl methacrylate; dialkylaminoalkyl-acrylamide; and dialkylaminoalkyl-methacrylamide;
the crosslinking agent is selected from the group consisting of methylene bisacrylamide, ethylene glycol diacrylate, polyethylene glycol dimethacrylate, diacrylamide, triallylamine, glyoxal, ethyleneglycol diglycidyl ether, allylpentaerythritol, and trimethylolpropane diallyl ether;
the non-ionic monomer is selected from the group consisting of acrylamide; méthacrylamide; N-alkyl acrylamide; N-vinyl pyrrolidone; N-vinyl formamide; N-vinyl acetamide; vinylacetate; vinyl alcohol; acrylate esters; and allyl alcohol; and the anionic monomer is selected from the group consisting of: acrylic acid; methacrylic acid; itaconic acid; crotonic acid; maleic acid; fumaric acid; and monomers performing a sulfonic acid or phosphonic acid function; said anionic monomer being in any of its acid, or partially or totally salified form.

\* \* \* \* \*